Dec. 18, 1945.         C. M. RIFENBERGH         2,391,038
ELECTRICAL DEVICE
Filed Oct. 17, 1942

INVENTOR
Clare Morgan Rifenbergh
BY Harness, Dickey & Pierce.
ATTORNEYS.

Patented Dec. 18, 1945

2,391,038

UNITED STATES PATENT OFFICE 2,391,038

ELECTRICAL DEVICE

Clare Morgan Rifenbergh, New York, N. Y., assignor to Federal Telephone and Radio Corporation, Newark, N. J., a corporation of Delaware Application October 17, 1942, Serial No. 462,399

7 Claims. (Cl. 175—21)

The present invention relates to electrical devices and to improved methods of making same. In its herein illustrated embodiments, the invention provides inductance coils having improved and accurately controllable physical and electrical characteristics.

It has long been known that inductances of usual construction possess a number of characteristics which are undesirable in applications where precision and constancy of physical and electrical characteristics are of importance. Illustrative such applications are in the fields of electronic apparatus and instrument engineering.

Generally speaking, the value of an inductance, measured in henries, increases as the ratio of its length (measured axially) to its mean diameter decreases, and decreases as this ratio is increased. Precise formulae for computing the inductance of various types of coils are available in standard texts and handbooks, such, for example, as the Standard Handbook for Electrical Engineers, sixth edition, published by McGraw-Hill Book Company, but the foregoing physical dimensions appear as factors in all such formulae. Other factors, of course, include the number of turns and the dimensions, form and nature of the magnetic circuit.

Various influences tend in service to alter or render inconstant the value of inductances. Certain of these influences include vibratory or other physical disturbances which tend to alter the physical dimensions of the coil or the physical position thereof with respect to the magnetic circuit. Others include humidity and temperature, the effects of humidity producing changes in the electrical characteristics of the coil, for example, by providing equivalent low resistance leakage paths between the elements. Temperature changes, of course, produce material changes in the specific resistance of the coil, but also cause appreciable changes in the inductance of the coil, it being recognized that an inductance coil of usual construction has a positive thermal coefficient of inductance.

With the foregoing general considerations in view, the principal objects of the present invention are to provide inductance coils which may be readily, economically, and rapidly manufactured by the use of readily available materials, and which exhibit improved and accurately controllable physical and electrical characteristics; to provide improved methods of making such devices; to provide such arrangements wherein the inductance coil is suspended within a solid body, preferably a plastic body, in such relation as to protect the coil from physical disturbances, so as to shield it from the effects of changes in humidity, and so as to enable a precise and accurate control of its electrical characteristics; to provide such arrangements wherein the suspension is such that the plastic or other material permeates all spaces between the several turns, and between the several layers, if there is more than one layer, of the coil; to provide such arrangements wherein the suspension is such that changes in at least certain physical dimensions of the coil, which accompany changes in temperature, are substantially controlled or substantially modified by the thermal characteristics of the plastic or other material; to provide such arrangements wherein the thermal characteristics of the plastic or other material are so related to the thermal characteristics of the coil as to enable the normal tendency of the inductance of the coil to change with changes in temperature to be partially or entirely counteracted, or, in fact, be reversed, thereby producing a structure having a desired and accurately controllable positive or negative thermal coefficient of inductance; to provide such arrangements wherein the core structure associated with the coil, and which may be formed of usual materials, such, for example, as molded and compressed powdered iron, is also suspended within the plastic or other material in such relation that changes in temperature, which cause physical changes in the dimensions of the plastic or other body, can be utilized to cause proportional changes in the physical dimensions or form of the magnetic circuit for the coil, and to produce electrical systems embodying a plurality of electrical elements, subject to thermal changes, which are protected, as aforesaid, so that such thermal changes affect such elements in matched relation.

With the above as well as other and more detailed objects in view, which appear in the following description and in the appended claims, preferred but illustrative embodiments of the invention are shown in the accompanying drawing, throughout the several views of which corresponding reference characters are used to designate corresponding parts and in which:

Figure 1 is a view in elevation of an inductance coil embodying the invention;

Figs. 2 and 3, respectively, are bottom and top plan views of the structure of Figure 1;

Figs. 8 and 9 are views of a further modification of the invention.

Figure 1:
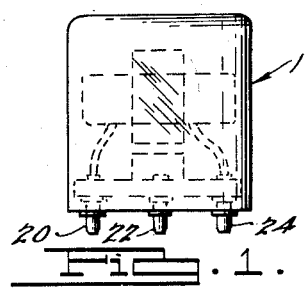
Figure 2:
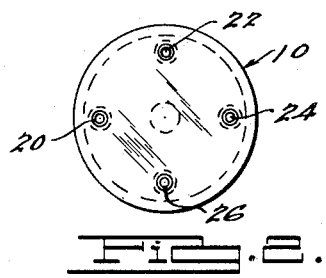
Figure 3:
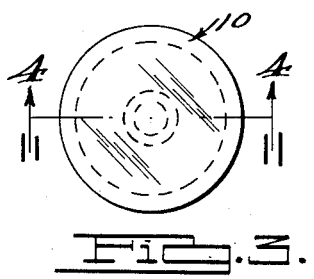
Figure 4:
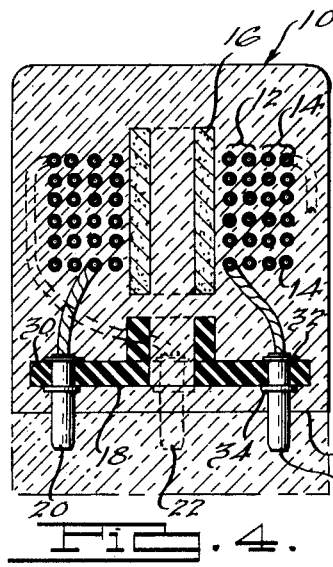
Fig. 4 is a view taken along the line 4—4 of Fig. 3.

It will be appreciated from a complete understanding of the present invention that in its more generic aspects the improvements thereof may be embodied in various different types of electrical devices. Moreover, as applied to inductances, the invention may be embodied in various different types including, for example, the familiar single layer wound and multiple layer wound types, and also including inductances having one or a plurality of related coils. Also, a wide variety of magnetic circuits for the inductances may be used. The particular forms of the invention which are specifically disclosed herein are, accordingly, to be considered in an illustrative and not in a limiting sense.

Referring first to Figs. 1 through 4, one practical embodiment of the invention is shown as comprising an outer encasing body 10 within which is suspended an inductance comprising a pair of coils 12 and 14, a core structure 16 therefor and a terminal block 18. In the illustrated form, two external connections are provided for each of the coils 12 and 14, and for this purpose terminals 20, 22, 24 and 26 are provided, the ends whereof project outwardly from the under side 28 of the body 10 for connection in any suitable manner to the associated circuit elements.

The coils 12 and 14 may be conventionally formed of usual insulated wire, wound in desired relation, all in accordance with conventional practice, but preferably and as shown, coil 12 is directly on the core 16, and coil 14 is wound upon coil 12. When so wound there will still generally be left a small spacing between the coils and the core, and between the various coil turns, shown exaggerated in the drawing for the sake of clarity. The core 16 may be of suitable form and may be made of various materials. It is illustrated as being of tubular form and it is preferred to form it of a compressed powdered iron. The terminal block 18 may be formed of suitable insulating material and is provided with a flange 30 which receives suitable supporting elements 32 and 34, which are associated with and hold the terminals 20, 22, 24 and 26 in place.

It is to be particularly noted that, except for the externally projecting portions of the terminals 20, 22, 24 and 26, the inductance is completely enclosed within by the plastic material, which plastic material fills all of the spaces between the several turns of the coils 12 and 14, the spaces between these coils and the core, and the spaces through and around the core and the terminal block 18. Broadly speaking, various types of plastics may be employed in forming the body 10, including those of the thermo-setting powdered types. A feature of the invention resides however, in the use of a plastic material of the type which can readily be converted from a freely liquid, relatively low gravity form to a solid. Such plastics have the advantage that the inductance structure as a whole can be introduced into a pool thereof, retained in a suitable mold, after which the plastic may be solidified. By introducing the inductance into the plastic while in liquid form, it will be appreciated that the freely flowing liquid is readily enabled to permeate all of the spaces in and around the inductance, so that each unit surface of the inductance is directly engaged and enclosed by the adjacent plastic body. It is preferred to perform the above "casting" operation in an evacuated region, so as to insure to the highest degree the above complete permeation of all interstices, and to prevent the formation of bubbles.

The plastic employed should also be one which has reasonably good dielectric properties and which, in its solid state, is reasonably resilient. For the reasons mentioned below in connection with the discussion of the control of the thermal coefficient of inductance, also, it is preferred to employ a plastic which has a considerably higher thermal coefficient of expansion than has the wire used in the coil or coils of the inductance, and which, further, is accurately cyclic, i. e., which, though passed through a number of temperature changes, stably maintains for each such temperature a fixed dimension.

Preferred such plastics include polystyrene and ethyl cellulose, both of which embody all of the advantageous features, discussed above, in greater or less degree, and which are also readily available.

The mechanical advantages of the structure of Figs. 1 through 4 will be readily apparent from the foregoing discussion, it being noted that the coil and core elements are positively supported in their proper relative positions and are protected from external disturbances which might otherwise alter these relative positions and, consequently, alter the inductance of the unit. Illustrative such disturbances are sustained vibrations of various amplitudes and frequencies, and shocks of various kinds and intensities. Disturbances of these types, as well as others, are found in practice to not only weaken inductances of usual construction, as by fatigue, but to also distort them or modify the size, shape, or spacing between turns to such an extent as to appreciably alter the inductance thereof. It will be equally evident that the device is totally free of effects of humidity changes, since the plastic bodies thoroughly enclose the inductance elements and since the plastic material tightly bonds to the outwardly projecting terminals 20, 22, 24 and 26 and prevents the introduction of moisture along these terminals.

Coming now to the control of the thermal coefficient of inductance, and as aforesaid, inductances of usual construction have a positive thermal coefficient. In all cases, increases in the ratio of the length of the coil (measured axially) to the mean diameter of the coil decrease the inductance thereof, and decreases in such ratio increase the inductance thereof. The ultimate strength of the plastic bodies, which it is preferred to use, is insufficient to materially control changes in the mean diameter of the coil, which would normally accompany changes in temperature. The forces required, however, to control changes in the axial length of the coil or coils are very materially lower than those required to control changes in diameter and, consequently, plastics having the previously described characteristics can be effectively utilized to desirably increase the length of the coil in response to increases in temperature and to correspondingly decrease the length of the coil in response to decreases in temperature.

Accordingly, by properly relating the thermal coefficient of the plastic body to the diameter and the normal axial length of the coil, and the thermal coefficients of the coil and core material, the plastic may be caused to increase or decrease the length of the coil by an amount sufficient to partially or entirely counteract the effect of a corresponding increase or decrease in the mean diameter of the coil. Further, such changes in length may be caused to exceed the effect of the changes in mean diameter. Consequently, by suitably relating the elements, as aforesaid, inductances may be produced having their thermal coefficient of inductance falling at any desired point in a range between predetermined positive and negative limits. In producing inductances having negative thermal coefficients, it will be appreciated that the thermal coefficient of expansion of the plastic should materially exceed the thermal coefficient of expansion of the material which forms the coil. For example, polystyrene has a thermal coefficient of expansion of approximately 60 to 70 parts per million per degree centigrade as compared to a coefficient of approximately 17 parts per millon per degree centigrade for copper.

Figure 5:
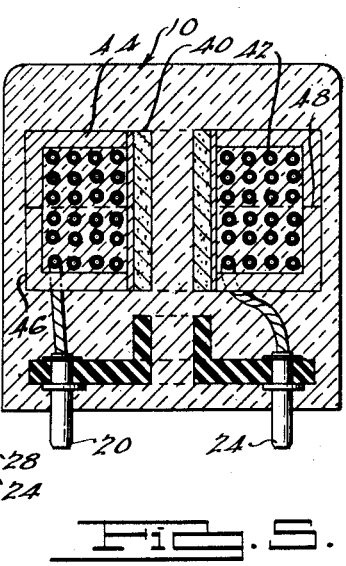
Figs. 5, 6 and 7 are views in central, longitudinal section of modifications of the invention.

In the modified form of the invention shown in Fig. 5, the arrangement is generally the same as in Figs. 1 through 4, with the exception that only a single coil is employed, and that a closed magnetic circuit for the coil 42 is provided by the opposed cups 44 and 46, which may be formed of the same material as the core 40, for example as aforesaid, of powdered iron. As shown, however, the cups 44 and 46 may freely engage each other at the surfaces 48, or may be normally spaced slightly apart. With such an arrangement, elongations of the plastic body produced by changes in temperature serve to produce a separation between the cups or to increase such separation. Decreases in temperature, of course, enable the plastic body to bring the cups 44 and 46 closer together. These relative movements of the cups produce a variable air gap between the cups which, as will be understood, alters the permeability of the magnetic circuit, enabling a further control of the electrical characteristics of the device in response to changes in temperature.

Figure 6:
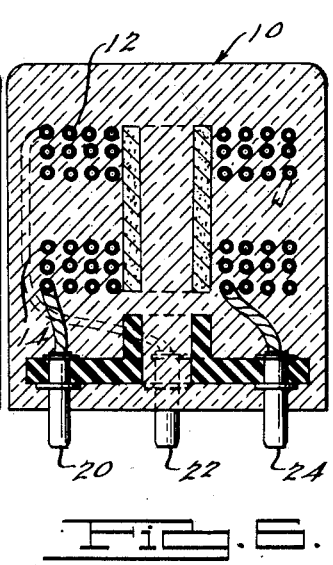
Figure 7:
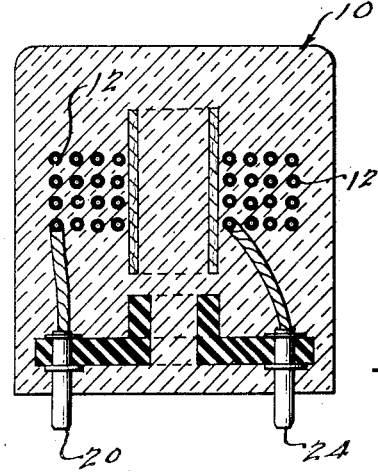

In the further modified embodiments of the invention shown in Figs. 6 and 7, the arrangements are similar to the embodiment of Figs. 1 through 4 with the exception that Fig. 6 illustrates an inductance having a pair of "pie" type windings, and Fig. 7 shows a single "pie" type winding on a paper or other tube which acts only as a form to support the winding.

Supplementing the above description of the preferred method of producing the structure of Figs. 1 through 4, it is preferred to initially form the plastic body so that all of the electrical elements are completely embedded therein, and thereafter by a shaving, cutting or other process to remove the portion 10a down to the normal end surface 28, which action, as will be understood, exposes the outer end portions of the terminals 20, 22, 24 and 26.

As previously mentioned, the embodiment may advantageously be incorporated, in its broader aspects, in various types of inductances, including, for example, those of both the single layer wound types and those of the multiple layer wound types. The invention appears, however, to be particularly advantageous in connection with multiple layer coils, since such types are even more difficult to control, by known methods, than are coils of the single layer type.

Figure 8:
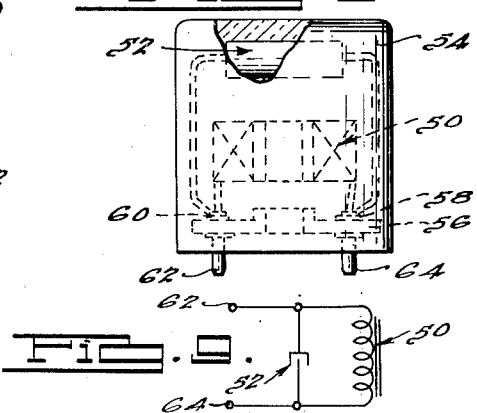

In many instances, it is important to provide a combination of electrical elements and to not only protect all of the elements of such combination against physical disturbances, humidity changes or other influences, but to also insure that all such elements have substantially equal rates of response to temperature changes. For example, measuring apparatus may comprise a plurality of different inductances and condensers, the relative electrical values whereof are of critical importance to the operation of the system, and all of which are subjected to similarly changing temperature conditions. In such cases, it is important that the several elements respond at the same rate to the change in temperature, and a further important feature of the invention, therefore, resides in providing that all such elements be subjected to the same type of thermal environment. More particularly, it will be appreciated that the previously mentioned plastics have a relatively low rate of heat transfer and, consequently, an inductance encased within a plastic body, as aforesaid, will have a lower rate of response to ambient temperature changes than will a corresponding or related element which is exposed to the atmosphere, and it is, therefore, proposed to encase such related elements in bodies which have similar thermal characteristics. An example of this feature of the invention is shown in Figs. 8 and 9, wherein a conventional tuned circuit of the parallel type comprises an inductance 50 and a condenser 52, having associated terminals 62 and 64, by which they may be connected to an external circuit. In Fig. 8, elements 50 and 52 are both encased in a plastic body 54, in the manner previously described, which plastic body, also as aforesaid, is provided with a terminal block 56, which supports the externally projecting terminals 62 and 64. With such an arrangement, if the ambient temperature increases, the change in temperature of element 50 will occur at substantially the same rate as the change in temperature of element 52, and such elements will, consequently, maintain predeterminable relative magnitudes.

It is to be noted, also, that the herein disclosed encasing materials have definitely predeterminable thermal characteristics and by encasing electrical elements within such materials, the rates of change of the elements can be controlled so as to bear a desired lagging relation, or in certain cases, leading relation, to temperature changes of other related elements.

Although only several specific embodiments of the invention have been described in detail, it will be appreciated that various further changes may be made without departing from the spirit and scope of the invention.

What is claimed is:

1. An inductance device comprising a helical coil of a plurality of spaced turns of conductive material having a given thermal coefficient of expansion, and having predetermined axial and radial dimensions, said dimensions being such that the ratio of axial to radial dimensions of the coil tends normally to vary inversely with temperature, and a solid, resilient insulating material encompassing said coil and substantially surrounding the turns of said coil, whereby expansion and contraction of said insulating material will tend axially to move the turns of said coil, said insulating material having a thermal coefficient of expansion greater than said given coefficient of expansion whereby the variation in ratio of axial to radial dimensions is at least partially compensated.

2. An inductance device according to claim 1, wherein said conductive material is copper and said insulating material is polystyrene.

3. An inductance device according to claim 1, wherein said conductive material is copper and said insulating material is ethyl cellulose.

4. A transformer device comprising two mutually coupled helical coils each including a plurality of spaced turns of conductive material having a given thermal coefficient of expansion, and having predetermined axial and radial dimensions, said dimensions being such that the ratio of axial to radial dimensions of the coils tends normally to vary inversely with temperature, and a solid, resilient insulating material encompassing said coils and substantially surrounding the turns of said coils, whereby expansion and contraction of said insulating material will tend axially to move the turns of said coils, said insulating material having a thermal coefficient of expansion greater than said given coefficient of expansion whereby the variation in ratio of axial to radial dimensions is at least partially compensated.

5. A transformer according to claim 4 further comprising a magnetic core for said transformer coils, said core being likewise encompassed in said insulating material.

6. A transformer according to claim 4, wherein said coils are coaxially and concentrically disposed.

7. A transformer according to claim 4, wherein said coils are coaxially disposed and are spaced apart axially.

CLARE MORGAN RIFENBERGH.